United States Patent [19]

Keeney et al.

[11] 4,273,367
[45] Jun. 16, 1981

[54] PIPE COUPLING

[75] Inventors: Gary E. Keeney; Allen K. Zurcher; Ervin C. Loomis, all of Greene, Iowa

[73] Assignee: Plasta-Plug, Inc., Greene, Iowa

[21] Appl. No.: 879,627

[22] Filed: Feb. 21, 1978

[51] Int. Cl.³ .............................................. F16L 21/06
[52] U.S. Cl. ............................. 285/419; 285/DIG. 4
[58] Field of Search ................. 285/DIG. 4, 373, 419, 285/293, 236; 24/206 A, 16 PB

[56] References Cited

U.S. PATENT DOCUMENTS

| | | | |
|---|---|---|---|
| 420,076 | 1/1890 | Kohlmyer | 285/419 X |
| 823,591 | 6/1906 | Eager | 285/419 |
| 3,214,808 | 11/1965 | Litwin | 24/206 A X |
| 3,239,254 | 3/1966 | Campbell | 285/419 |
| 3,298,721 | 1/1967 | Wiley | 285/419 |
| 3,405,957 | 10/1968 | Chakroff | 285/233 X |
| 3,501,179 | 3/1970 | Boynton et al. | 285/373 |
| 3,633,947 | 1/1972 | Nelson | 24/16 PB X |
| 3,708,187 | 1/1973 | Campbell | 285/DIG. 4 X |
| 3,711,633 | 1/1973 | Ghirardi et al. | 285/DIG. 4 X |
| 3,897,090 | 7/1975 | Maroschak | 285/DIG. 4 X |
| 3,899,198 | 8/1975 | Maroschak | 285/DIG. 4 X |
| 4,059,293 | 11/1977 | Sipler | 285/236 |
| 4,061,368 | 12/1977 | Auriemma | 285/DIG. 4 X |
| 4,084,844 | 4/1978 | Abner | 285/DIG. 4 X |
| 4,093,288 | 6/1978 | Suzuki | 24/16 PB X |
| 4,165,111 | 8/1979 | Zanichelli | 285/419 |

FOREIGN PATENT DOCUMENTS

| | | | |
|---|---|---|---|
| 2100952 | 7/1972 | Fed. Rep. of Germany | 285/DIG. 4 |
| 1251076 | 12/1960 | France | 24/206 A |
| 53430 | 1/1967 | German Democratic Rep. | 24/206 A |
| 515224 | 2/1955 | Italy | 24/206 A |

Primary Examiner—Thomas F. Callaghan
Attorney, Agent, or Firm—Breneman, Kane & Georges

[57] ABSTRACT

A pipe coupling for joining abutting sections of pipe particularly adapted for connecting corrugated plastic drain pipe to provide a strong yet flexible coupling having a relatively smooth external surface thereby avoiding entanglement of the coupling in the guide of a trencher for the subterranean laying of the pipe. The pipe coupling consists of a substantially flexible rectangular shaped sleeve having at least two rows of teeth disposed along the length of the sleeve and means for fastening the ends of the sleeve around two sections of pipe to allow each row of teeth to engage at least one corrugated groove disposed at or near the end of each section of pipe to provide a coupling having a wide range of applicability for connecting a variety of corrugated pipe configurations.

22 Claims, 15 Drawing Figures

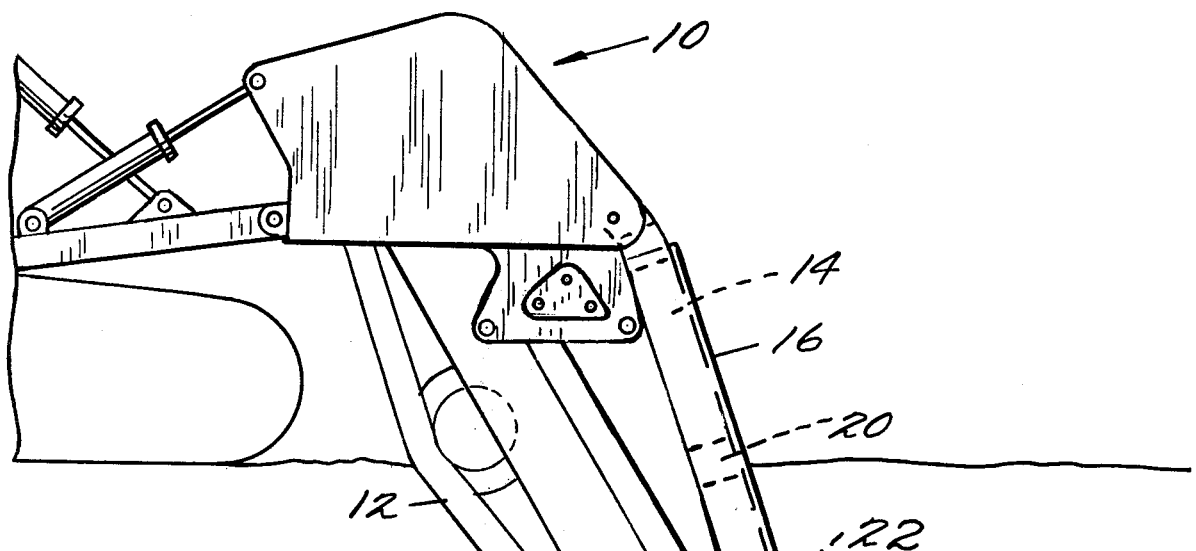
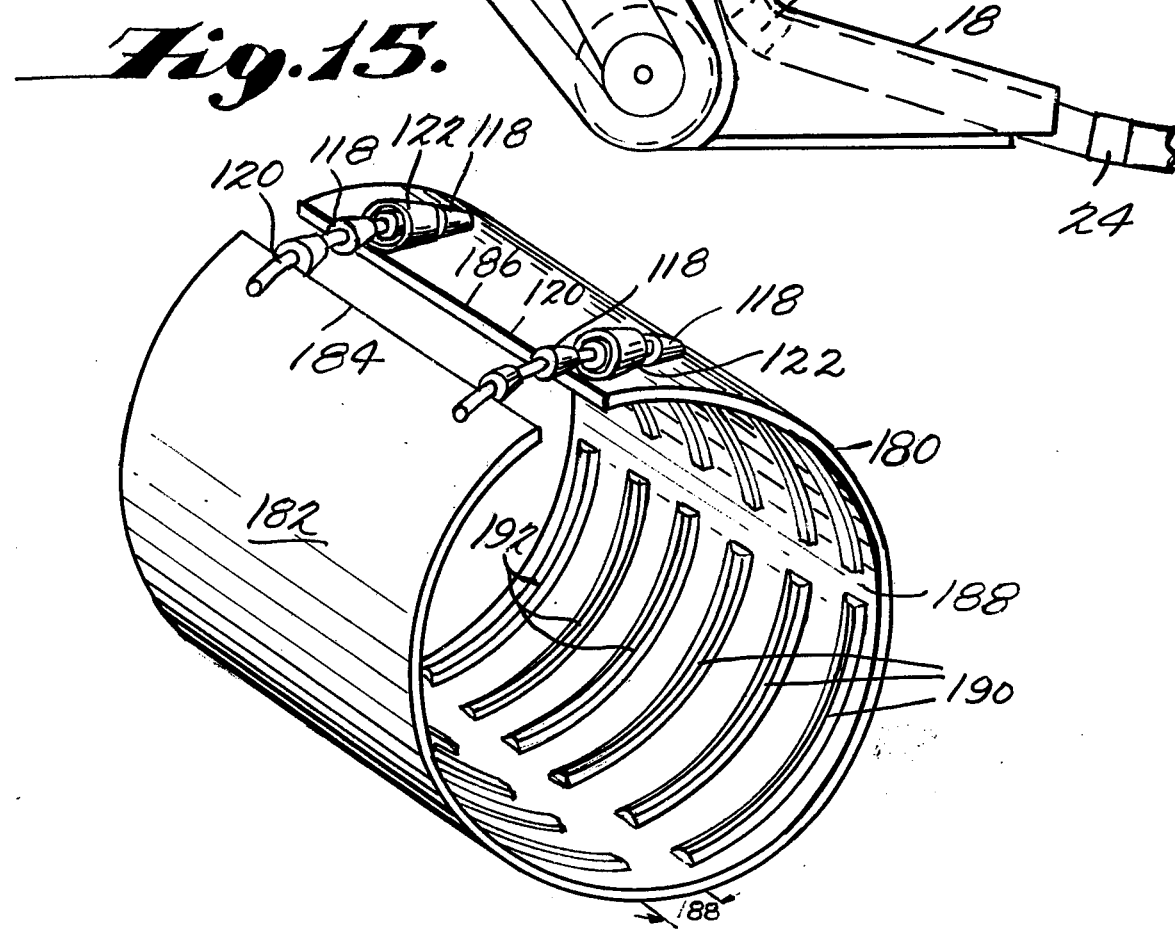

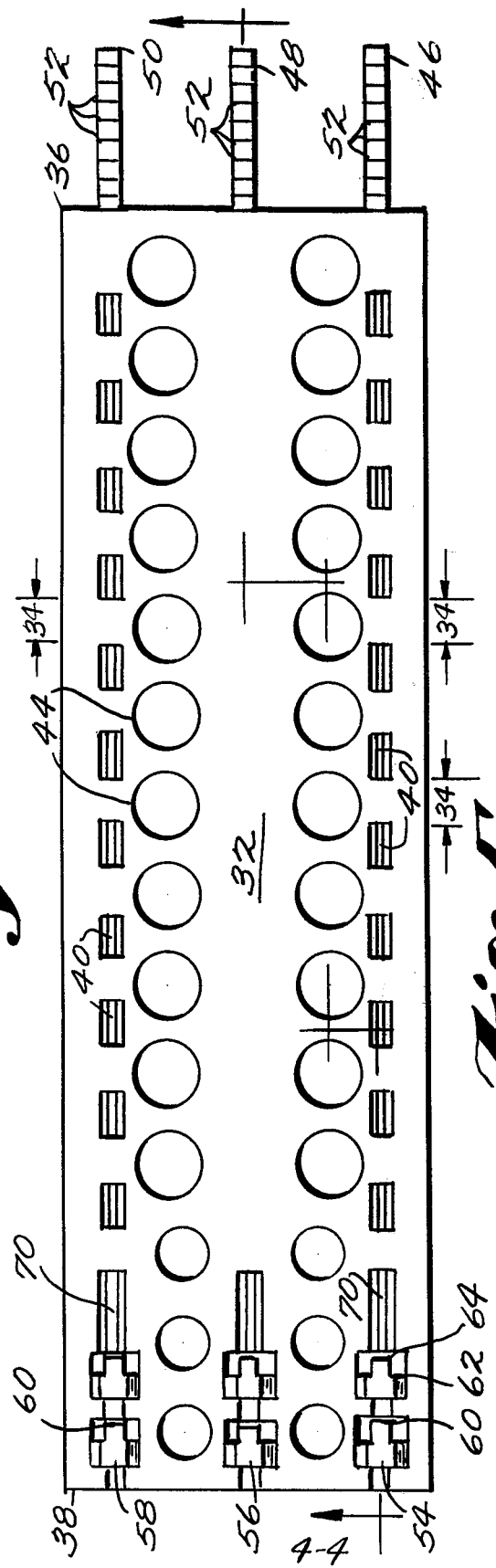
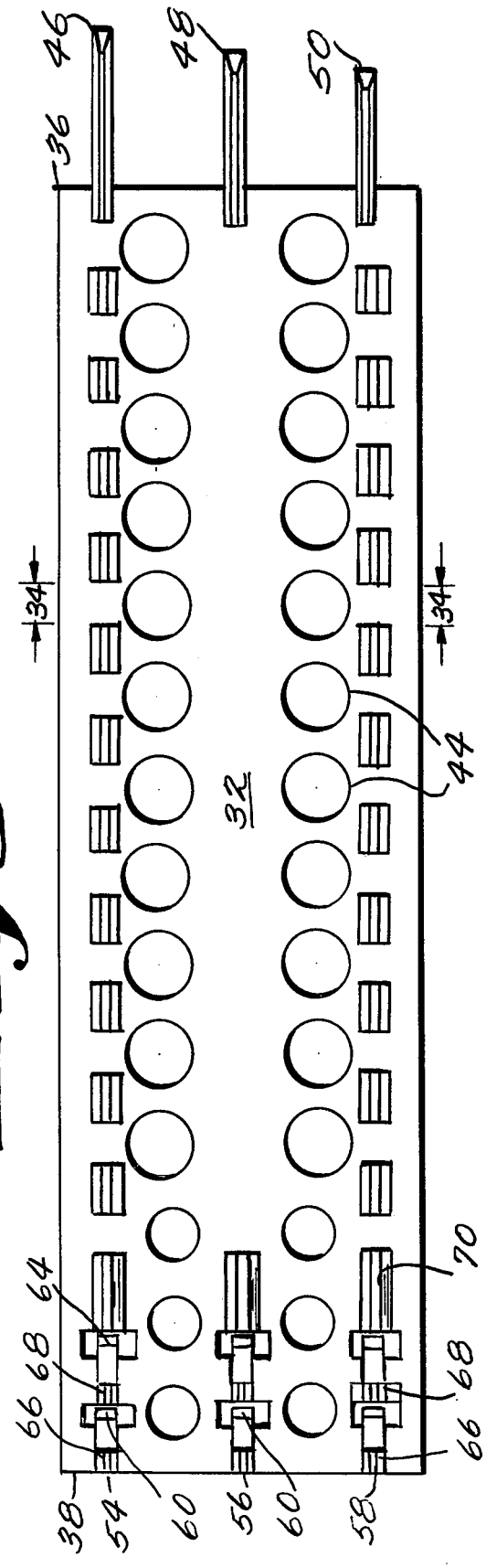

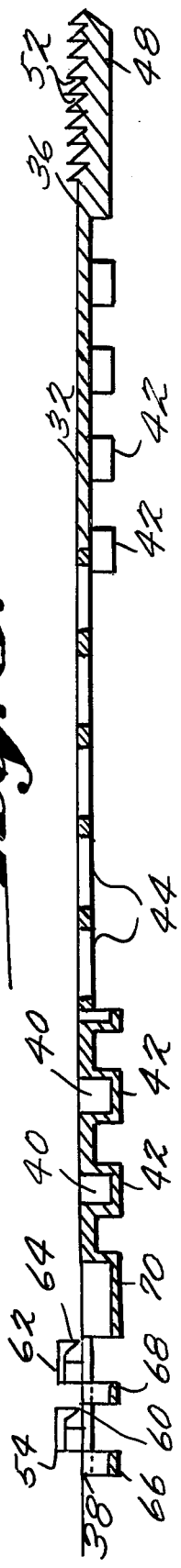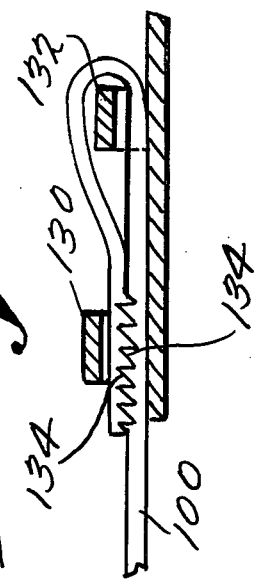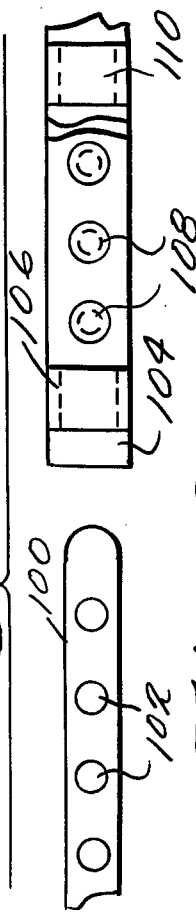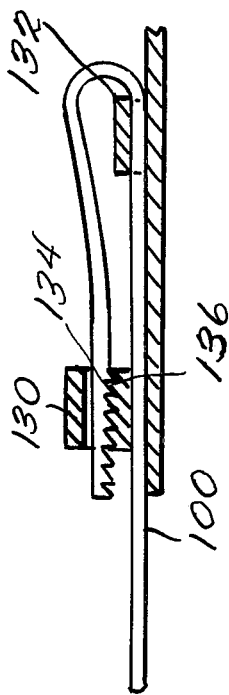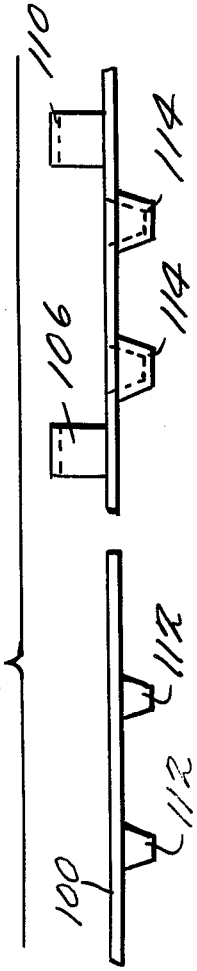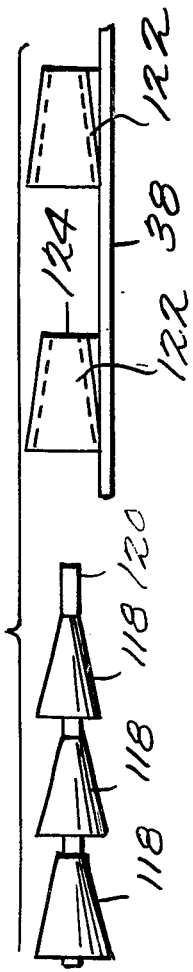

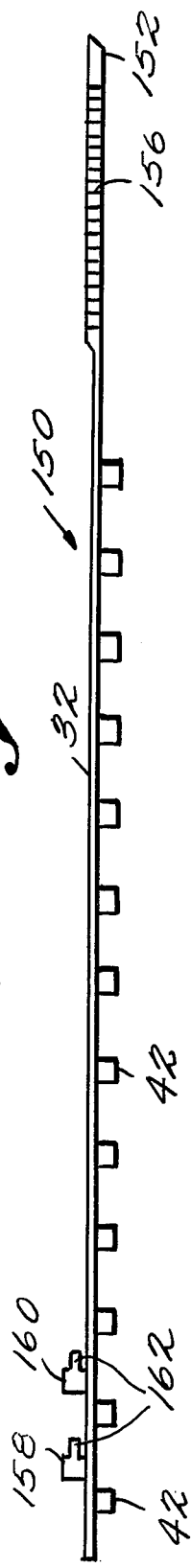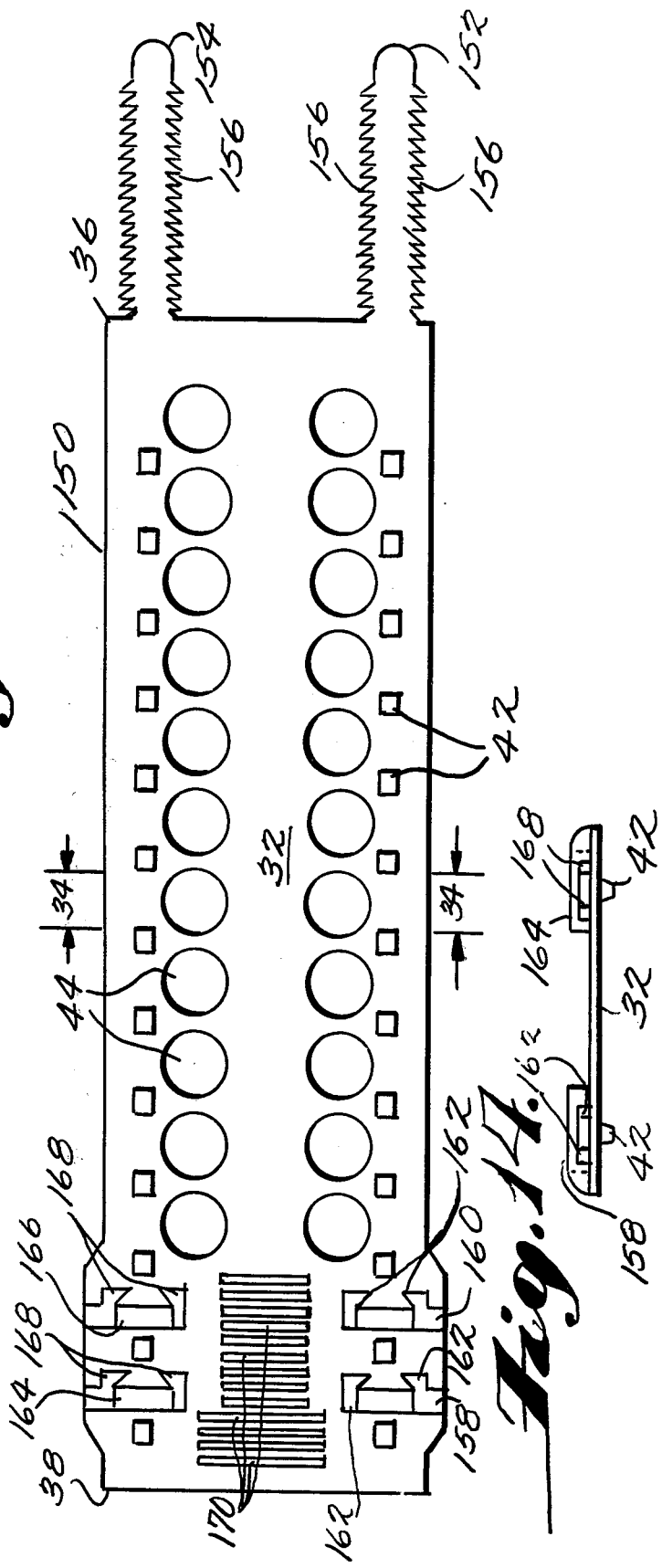

PIPE COUPLING

BACKGROUND OF THE INVENTION

1. Field of the Invention

The present invention relates to a pipe coupling which can be manufactured and shipped in a substantially flat configuration and which provides a flexible coupling joint achieved by employing a flexible sleeve member, flexible teeth or a combination thereof to provide a flexible yet strong connection for corrugated drain pipe that is twisted and bent during ground laying operations. More particularly, the invention pertains to a flexible pipe coupling having a substantially rectangular shaped flexible sleeve member having disposed thereon at least two rows of teeth along the length of the sleeve for engaging at least one corrugated groove of each section of abutting pipe to accommodate a wide variety of corrugated pipe configurations.

2. Description of the Prior Art

A variety of couplings exist for joining various types of corrugated pipe. One form of circularly and spirally corrugated pipe is the rigid metal conduit type pipes which employ a variety of virtually rigid couplings for joining sections of pipe. Representative of this type of coupling are U.S. Pat. Nos. 3,239,254 (FIG. 5); 3,501,179 (FIG. 7); 3,708,187 and 4,061,368.

Corrugated metal pipes and pipe couplings for metal pipes and markedly different from corrugated plastic drain pipes and couplings therefor. In metal conduit pipes the trenching and pipe laying operations are not carried out in a single operation in that metal pipe couplings do not simultaneously require the inconsistent requirements of flexibility and strength required of couplings employed for corrugated plastic drain pipe. Couplings for plastic corrugated drain pipe must furthermore not have flanges which significantly protrude from the outside circumference of the coupling which can become lodged in the trencher, resulting in shearing of the plastic pipe, failure of the joint and considerable interruption in trenching operations.

Corrugated plastic drain pipe in contrast to corrugated metal conduit pipe is employed for draining swamps and fields and is installed by employing a trencher which simultaneously digs a trench, lays the drain pipe line and with some trenchers also covers the installed drain pipe. During the installation of the plastic corrugated drain pipe the pipe is required to make a number of bends and turns while being twisted and under tension as it moves from the position above ground on the trencher down through a guide down to the trencher shoe and into the trench. Furthermore, as there is no set standard the manufacturers of corrugated plastic drain pipe utilize their own distinctive lip and groove configuration.

The lack of uniformity between the size, shape, height and width of the groove in corrugated plastic drain pipe in conjunction with the procedure for installing such pipes has presented considerable problems in providing a coupling for joining sections of drain pipe. One such prior art coupling for joining sections of corrugated plastic drain pipe is described in U.S. Pat. No. 3,899,198. Another prior art coupling of widespread use in the field consists of a split plastic sleeve having an appearance similar to the corrugated drain pipe. In use this coupling is spread open and the corresponding sections of pipe inserted therein to mate with corresponding grooves disposed on the drain pipe. These prior art couplings are generally the same diameter or of a slightly larger diameter so that they can be tied in place with either a bailing wire or twine.

Hand tied couplings not only required considerable time in opening the couplings but also required a high degree of care. When twine was employed, the hand tied knot had to be reasonably tight in the groove of the sleeve to secure the lip and groove of the underlying drain pipe to prevent slippage. On the other hand, use of wire to fasten the coupling assured a reasonably tightly secured coupling but resulted in coupling failures caused by the tie wire becoming caught in the guide or shoe of the trencher. In addition, hand tied wire stressed the tying wire so that the stretching involved with the installation and covering of the pipe caused the wire to break and the coupling to fail.

It is critically important in drain pipe joining operations that the sleeve or coupling utilized for joining the pipe sections does not allow the sections to become disconnected during trenching, pipe laying and covering operations. Coupling failure at the least interrupts valuable trenching time and requires stopping the trencher, digging up the pipe and then recoupling the sections. Alternatively, failure to immediately ascertain coupling failure results in improper field drainage requiring ascertaining the point of failure, removing crops or structure and then digging up the line to repair the coupling.

The prior art couplings for joining corrugated plastic drain pipe not only exhibit the disadvantage of requiring considerable hand labor and time to join sections of pipe but also result in increased expense due to the inefficiency in packing, shipment and application of prior art circular couplings. The problems resulting from the conditions required for plastic drain pipe couplings and the difficulties resulting when such couplings do not maintain their integrity in trenching operations reveal many of the problems involved with prior art couplings.

SUMMARY OF THE INVENTION

The disadvantages and limitations of prior art pipe couplings including much of the hand labor required for installing and securing couplings to plastic corrugated drain pipes are obviated by the present invention. The coupling of the invention for connecting abutting sections of corrugated plastic pipe includes a substantially flexible rectangular shaped sleeve having at least two or more rows of teeth disposed along the length of the sleeve and means for fastening and adjustably securing the ends of the sleeve around two sections of corrugated pipe to allow each row of teeth to engage at least one corrugated groove disposed at or near the end of each section of pipe. The novel coupling in part achieves its advantages by providing a strong but at the same time flexible connetion for two sections of corrugated plastic tubing. The properties of strength and resiliency in the preferred embodiment are attained by molding the novel coupling of a resilient plastic material such as polyethylene or nylon so that the rectangular shaped sleeve in combination with the resilient sleeve accomodates the bending, twisting and tension of the corrugated plastic drain pipe while the teeth similarly accommodate the expansion and contraction of grooves contained on the drain pipe. It will be recognized further that the advantages of the present invention can to a lesser degree be achieved by utilizing resilient teeth with a narrow non-resilient sleeve or a wide resilient sleeve with non-resilient teeth. It will further be recognized that the substantially flexible sleeve may be achieved by providing one or more flat sections disposed across the width of the sleeve to define the teeth and provide flexibility to the sleeve.

The advantages of the invention are attained wherein at least one row of teeth or ribs are disposed adjacent to one another along the length of the sleeve of the coupling and are adapted to engage at least one transverse groove disposed at or near the end of each section of the pipe to be joined. Furthermore, any number of rows of parallel teeth or ribs may be utilized in the coupling to engage more than one of the grooves in each of the sections of the drain pipe to be connected. However, while multiple engagement of grooves may provide additional strength to the coupling joint, the invention in its preferred embodiment contemplates the utilization of a single row of teeth or ribs disposed on either side of the pipe joint to accommodate a wide variety of corrugated plastic pipe configurations manufactured by the various suppliers of drain pipes. Furthermore, it has been found that the necessary strength of the coupling is assured by the single row of teeth where a plurality of independently locking means is provided for adjusting and securing the ends of the sleeve of the coupling tightly around the pipe joint while accommodating to a degree the individuality of the lips and grooves defining the circumference of different pipes by utilizing the resiliency of the sleeve, teeth, and substrate plastic pipe to achieve a secure lock.

The fastening and adjustably securing means provided at the ends of the sleeve of the novel coupling assist in providing the overall resilient strength required of a coupling capable of accommodating a variety of pipe configurations while flexibly yielding to withstand the bending, torque and tension involved in trenching and pipe laying operations. Typically the fastening means contemplated by the present invention in combination with the rows of teeth are the type that allow a one way tightening of the teeth by forcing the teeth into the drain pipe grooves in a secure confronting relationship.

The fastening and adjustably securing means employed may be of the pawl and ratchet variety or an adjustable strap employed with interlocking slots or a variety of other adjustable mechanical configurations as will be discussed hereinafter in greater detail. The fastening and securing means may further include a means for first threading and securing one end of the coupling to one section of the drain pipe prior to threading and securing the adjacent side of the end to the other section of drain pipe to be connected.

The novel coupling allows the sections to be joined by one man quickly and efficiently in the field by simply wrapping the flexible coupling around the sections of pipe to be connected and engaging the ratchets of the fastening means and compressing the ends together causing conforming of the sleeve, and teeth to the underlying drain pipe until the teeth are forced as tightly into the grooves as the configuration of the drain pipe will allow while tightly securing the coupling sleeve around the corrugated plastic drain pipe as tightly as the configuration of the drain pipe will allow.

In addition, the configuration of the novel pipe coupling and fastening and securing means, allows the coupling to be secured around the pipe in a close confronting relationship without portions of the fastening and securing means to project or become entangled in the trencher, trencher guide or shoe as the pipe is laid in the field. In addition, the present coupling is amendable to flat stacking and may be packaged and shipped far more efficiently than couplings employed in the prior art. In addition, the configuration of the teeth of the coupling in combination with the means for fastening and adjustably securing the coupling, provides a coupling that is capable of flexibly but strongly holding two sections of pipe together so that the pipe can be passed through a trencher guide into the trench which during the stretching and bending of the corrugated plastic pipe does not result in failure of the coupling securing the two sections of the joined pipe.

Other advantages of the present invention will become apparent to those skilled in the art from the specification in conjunction with the appended drawings which illustrate various aspects of the novel coupling of the present invention.

DESCRIPTION OF THE DRAWINGS

The invention will be more fully described in the following detailed description taken in conjunction with the accompanying drawings in which:

FIG. 1 is a schematic view illustrating a trencher generally employed in the installation of plastic corrugated drain and irrigation pipe depicting a combined trenching and pipe laying operation employing couplings constructed in accordance with the invention;

FIG. 4 is a top plan view of the outside surface of the novel coupling before it is wrapped around abutting sections of a corrugated drain pipe;

FIG. 5 is a top plan view of the inside surface of the novel coupling before it is wrapped around abutting sections of a corrugated drain pipe;

FIG. 6 is a side elevational view of the coupling of FIG. 4 taken along the arrow 4—4 of FIG. 4;

FIG. 7 is a top plan view depicting an alternative embodiment of the fastening and adjustably securing of the novel coupling;

FIG. 8 is a side elevational view of a further embodiment of a means for adjustably securing the ends of the coupling around a corrugated pipe;

FIG. 9 is a side elevational view of a further embodiment of a means for adjustably securing the ends of the novel coupling;

FIG. 10 is a side elevational view illustrating a further embodiment of a means for adjustably securing the ends of the coupling around a corrugated drain pipe;

FIG. 11 is a side elevational view further illustrating a means for securing the ends of the novel coupling;

FIG. 12 is a top plan view of the outside surface of the preferred embodiment of the novel coupling of the present invention;

FIG. 13 is a side elevational view of the novel coupling of FIG. 12;

FIG. 14 is a side elevational view of the means for adjustably securing the ends of the novel coupling of FIG. 12; and FIG. 15 is a perspective view of a further embodiment of a novel coupling constructed in accordance with the invention.

DETAILED DESCRIPTION OF THE INVENTION

Figure 2:
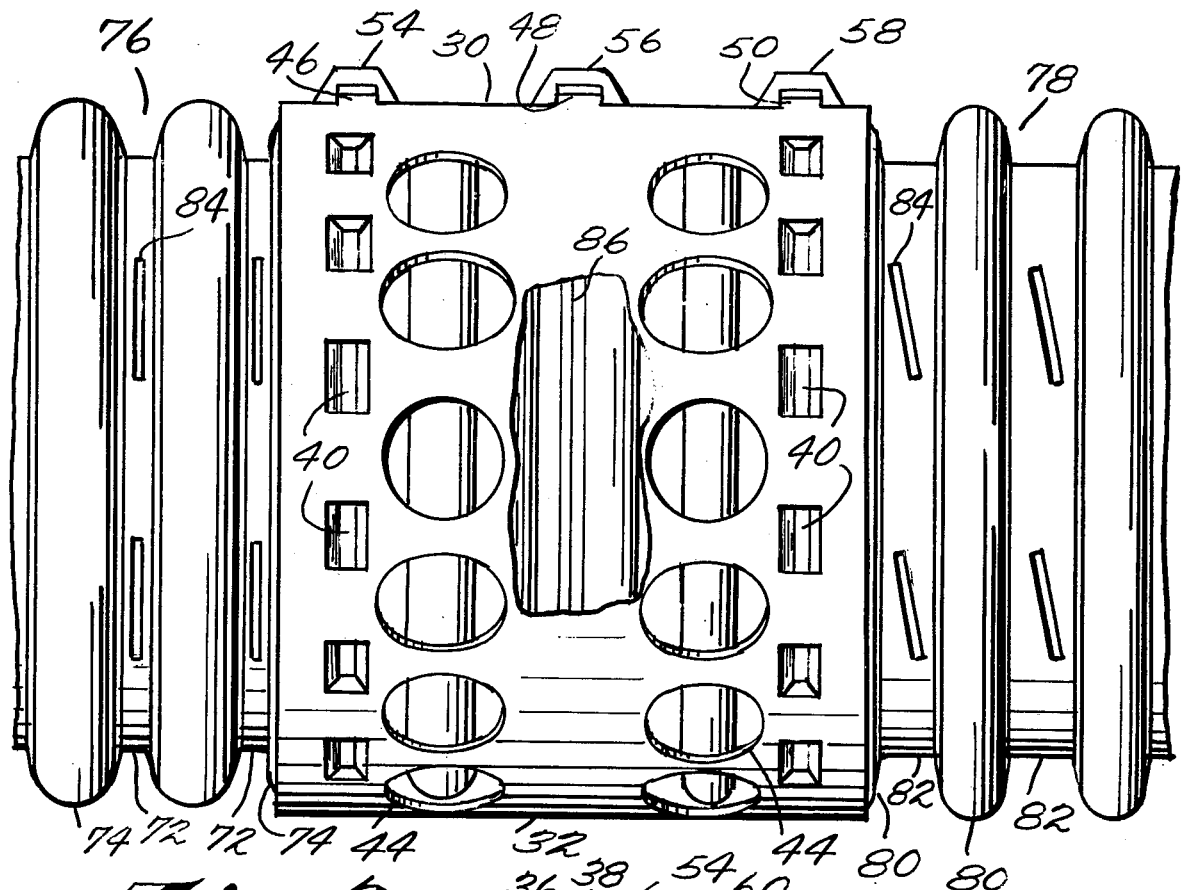
FIG. 2 is a side elevational view, partly in section illustrating a pipe coupling in accordance with the invention connecting abutting sections of corrugated drain pipe.

Referring now to FIG. 1, reference character 10 illustrates a trencher generally utilized for ground trenching and corrugated plastic pipe installation. Trencher 10 employs a conveyor type digging implement 12 for digging and removing ground to provide a trench of a predetermined depth for the installation of 100 to 250 foot sections of plastic pipe. As digging implement 12 removes ground to form a trench, corrugated plastic pipe 14 is generally simultaneously installed in the ground through trenching guide 16 terminating in a shoe 18 through which the corrugated plastic pipe travels for disposition into the trench during the course of travel of trencher 10. Guide 16 provides a rather restrictive path of travel for pipe 14 since the guide generally has an internal diameter only about 1 inch greater than the external diameter of pipe 14.

Trench pipe 14 may include one or more couplings 20, 22 and 24 for coupling sections of drain pipe in the trenching operation. In actual practice couplings, 20, 22 and 24 are generally not as close together as depicted in FIG. 1 for joining such short lengths of pipe, however couplings 20, 22 and 24, illustrate the bending, twisting and deformation that such couplings undergo as corrugated pipe and coupling travel down guide 16, shoe 18 and are covered with ground during the trench and pipe laying operations. In particular, coupling 20 in the guide 16 is subjected primarily to vertical tension forces expanding the corrugations in the plastic pipe while coupling 22 is subjected to torque, binding and tension in shoe 18 and coupling 24 is subjected to horizontal tension as a result of the movement of the trencher and the covering of the drain pipe as it is installed.

Trencher 10, which is generally in use employs a guide 16 of rather limited size which in conjunction with shoe 18 provide a closely confined route of travel for the drain pipe 14 and couplings 20, 22 and 24. Generally the diameter of the guide 16 and shoe 18 for drain pipe 14 is only slightly larger than the diameter of the pipe being installed so that couplings 20, 22 and 24 must exhibit not only strength and resiliency but also must display a compact fastening and adjustable securing means that does not have projections which could interfere or become entangled in the bends or joints of guide 16 and shoe 18 to result in coupling failure in the trencher 10.

As can be appreciated from FIG. 1, and as will be recognized by those skilled in the art the couplings 20, 22 and 24 must provide a reliable, strong yet flexible joint to withstand the twisting, bending and tension involved in the installation of a flexible corrugated drain pipe. Failure of the coupling during trenching operations at any point in guide 16 or shoe 18 requires the cessation of trenching operations, the replacement of the coupling and the rethreading of the trencher. Failure of the couple during the drain pipe covering operation is even a greater problem since such failure usually only manifests itself long after the land has been planted or otherwise used and requires the contractor to remove crops, structures, etc., and uncover at least a portion of the drain pipe to replace the coupling.

Figure 3:
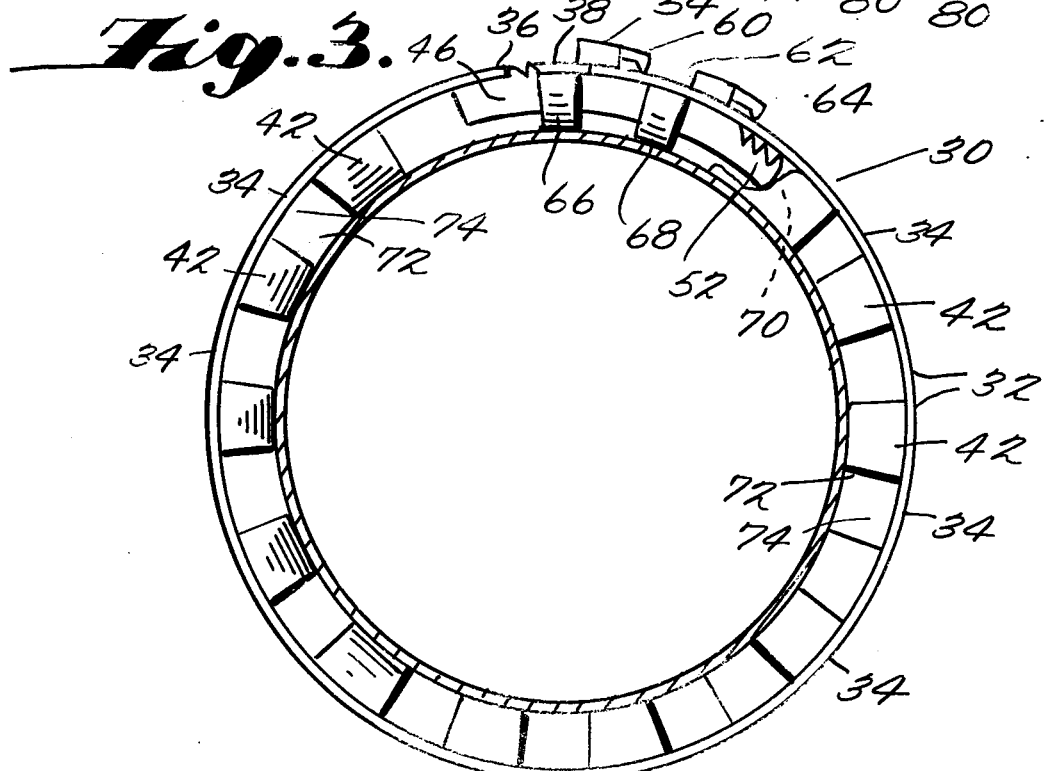
FIG. 3 is a cross-sectional view of the novel coupling of FIG. 2, illustrating the teeth of the coupling securing one section of corrugated pipe.

Referring now to FIGS. 2 and 3 reference character 30 illustrates a pipe coupling constructed in accordance with the invention in its operative form, connecting two sections of corrugated plastic pipes. Coupling 30 employs a flexible sleeve 32 formed of a substantially rectangular sheet of semi-rigid plastic or other resilient material. Coupling 30 may be formed of such resilient and semi-rigid materials as nylon or other thermoplastic material, such as polyethylene, polypropylene or polyvinyl chloride and which in the preferred embodiment is manufactured in a rectangular shaped flat sheet employing conventional techniques such as injection, extrusion or blow molding techniques. Preferably the wall thickness of sleeve 32 is about 0.02 to 0.060 although other wall thicknesses such as 0.5 inches may be utilized to achieve the advantages of the invention.

Couplings formed utilizing a single molding operation include a generally rectangular sleeve 32 having a plurality of flat flexible sections 34 disposed between ends 36 and 38 of sleeve 32. Sleeve 32 additionally includes two rows of bifurcated wedged shaped indentations 40 on the outside of coupling sleeve 32 which on the inside of coupling sleeve 32 forms two parallel rows of corresponding wedge shaped bifurcated projections forming teeth 42 for engaging a lip 74 and groove 72 of one section of corrugated drain pipe. Teeth 42 formed in the molding operation conveniently have a wall thickness generally corresponding to the wall thickness of sleeve 32. In the preferred embodiment each resilient bifurcated wedge shaped tooth 42 in combination with the sleeve 32 provides a partially laterally resilient locking combination for plastic corrugated drain pipe.

The resiliency of teeth 42 in combination with a resilient sleeve 32 provides the necessary flexibility and strength to insure the integrity of coupling 30 while the corrugated drain pipe travels down guide 16 (FIG. 1) and shoe 18 of the trencher while withstanding the tension, torque, bending and other deformation encountered in trenching, laying and covering operations. The resiliency of teeth 42 and sleeve 32 assist in accommodating the deformation of the drain pipe in trenching and also facilitates installation of the pipe by assisting in seating of the pipe in the ground, to conforming the drain pipe to the contour of the land and promotes pipe life by providing a resilient connection capable of accommodating seasonal changes in the ground. If a coupling were to be formed of metal or other solid non-resilient material the coupling could not be accommodated in present trenching operations for plastic drain pipe and, ground corrosion, environments and movements caused by frost heaves which would cause non-resilient couplings to crack or tear the corrugated plastic pipe and ultimately fail around the joint.

The necessary combination of strength and flexibility may be achieved entirely through either the utilization of a more resilient sleeve member 32 and non-resilient teeth 42 or the utilization of a less resilient sleeve member 32 with a more resilient teeth 42 or a combination thereof which is contemplated in the preferred embodiment of the present invention. Molding operations and resiliency of sleeve 32 and teeth 42 may be fostered by employing circular openings 44 in sleeve 32. These openings also assist in allowing ground seepage of water at the joints while promoting the flow of excessive volumes of water into the drain pipe when the ground around the joint becomes excessively saturated with water.

The advantages of the present invention are further enhanced and augmented by the adjustably securing and fastening means provided in the sleeve member 32 to facilitate the joining of ends 36 and 38 of sleeve member 32. FIGS. 4, 5 and 6, illustrate the novel coupling in its flat or shipping configuration while FIGS. 2 and 3 illustrate coupling 30 in its operative configuration connecting abutting sections of drain pipe. In FIG. 4, coupling 30 is illustrated with the outside diameter of sleeve 32 facing upward whereas in FIG. 5 the inside surface of the coupling 30 is facing upward. In FIGS. 2, 3, 4, 5 and 6, one embodiment of an adjustable fastening and securing means is illustrated wherein end 36 terminates in three V-shaped strap projections 46, 48 and 50. In FIG. 5, an alternative embodiment is illustrated wherein one of the straps 46 is longer than strap 48 and strap 48 is longer than strap 50 to assist in the joining of the coupling around a corrugated drain pipe as will be described hereinafter in greater detail. Disposed on the outside surface of each of the strap shaped projections 46, 48 and 50 and a series rearward facing notches 52. Disposed on end 38 is a corresponding series of openings 54, 56, and 58 each rearwardly terminating in a series of pawls 60 for engaging notches 52 on each of the V-shaped strap projections. In the preferred embodiment two such openings are provided in tandem for each of the V-shaped strap projection as is shown in FIGS. 3, 4, 5, wherein the second opening 62 includes a second pawl 64 for doubly engaging notches 52 on the strapped shaped projection 46.

V-shaped strap projections 46, 48 and 50, preferably terminate on the underside in a corresponding bifurcated wedge shape (FIG. 5) to provide additional lip and groove engagement in the lip 74 and groove 72 of the corrugated plastic drain pipe. End 38 contains one or more downwardly projecting V-shaped slots 66 and 68 in each of the openings 54, 56 and 58 to assist in maintaining pawls 60 and 64 in close engagement with notches 52 provided on each of the strap shaped projections 46, 48 and 50. In the preferred embodiment a final V-shaped groove 70 is provided for housing each of the strap shaped projections below the outside diameter of coupling sleeve 32.

FIGS. 2, 3, 4, 5 and 6 illustrate a preferred embodiment of the invention wherein two rows of teeth 42 are disposed parallel to one another at opposite sides of sleeve member 32 to form a coupling for connecting two sections of corrugated pipe. In this embodiment the coupling of the invention can accommodate a variety of corrugated plastic pipe and pipe sizes such as pipe 76 and 78 (FIG. 2) as may be required to be joined at the work site. Corrugated pipe 76 may utilize one number of lips 74 and grooves 72 per foot while corrugated pipe 78 utilizes a different number of lips 80 and grooves 82 of varying depth. Each of the sections of corrugated pipes 76 and 78 may also employ their distinctive arcuate slits 84 to assist in the draining operation of the pipe. The utilization of the single rows of parallel teeth of the novel coupling allows the coupling to accommodate a variety of types of corrugated plastic pipes. Coupling 30 engages at least one lip and groove of each of the sections of pipe 76 and 78 at some point intermediate the end of the respective pipes. Pipes 76 and 78 are disposed in the coupling in a confronting relationship with a space 86 disposed therebetween. As the pipes should be in reasonably close proximity but without requiring an absolute seal the novel coupling accommodates various pipes within the limits of pipe variation and severance of sections by modifying the size of space 86. The size of space 86 and holes 44 provided in coupling 30 within limits assist in drainage and irrigation of the ground surrounding the coupling and allows excessive quantities of water to be transported to other sections of the pipe and ultimately to a drainage area. Coupling 30 achieves its resilient joint in the preferred embodiment by utilizing the resiliency of the sleeve, teeth and fastening means to force the resilient teeth 42 in a secure confronting relationship to individually accommodate the lips and grooves of pipes 76 and 78 to accommodate a wide range of variation in corrugated pipes generally found at a work site.

Referring now to FIGS. 2, 3 and 6, it will be recognized that the means provided for joining the ends 36 and 38 of the sleeve 32 provides a compact coupling without large projections from the outside diameter of coupling 30 to catch in guide 16 and shoe 18 (FIG. 1). The slight projections of the pawl project only about 0.125 inches above the outside circumference of the coupling. The one way adjustable securement of the fastening mechanism allows the coupling to be wrapped around corrugated pipe and squeezed around the pipe by hand while the racheting mechanism automatically tightens and locks the sleeve around the corrugated pipe to the tightest position possible while taking advantage of the resilient teeth and the resiliency of the pipe to force teeth 42 into close confronting relationship with groove 72 and lip 74 of pipe 76. Teeth 42 may conveniently be about 0.21 to 0.36 inches wide at the base and about 0.21 to about 1 inch long at the base and about 0.015 to about 0.20 wide at the bifurcated wedge shaped tip and about 0.20 to about 0.99 inches long at the bifurcated tip and disposed about 0.5 inches from one another along the length of sleeve 32. Preferably teeth 42 are about 0.30 inches wide at the base and about 0.5 inches long at the base and about 0.15 inches wide at the bifurcated wedge shaped tip and about 0.5 inches long at the bifurcated wedge shaped tip.

Referring now to FIGS. 7, 8, 9, 10 and 11 there is illustrated alternative methods of adjustably securing and fastening the ends 36 and 38 of sleeve 32 of coupling 30. FIG. 7 illustrates one method of joining ends 36 and 38 wherein end 36 terminates in one or more flat shaped straps 100 including perforations 102 thereon. End 38 has a correspondingly slot shaped end for receiving strap 100 in a groove 104 disposed on end 38, groove 104 having a loop 106 provided thereon to assist in the tensioning and fastening perforations 102 of strap 100 over corresponding locking projections 108 provided in groove 104 and a second anchoring loop to secure strap 100 below the outside circumference of sleeve 32 to prevent accidental opening of the locking device while pipes 78, 76 and coupling 30 travel down guide 16 and base 18 of the trencher. Similarly in FIG. 8 a strap 100 includes a plurality of wedge shaped projections 112 for disposition through loop 106 for mating with corresponding wedge shaped troughs 114 disposed in end 38.

Referring to FIG. 9, a further embodiment of the means for adjustably receiving and fastening ends 36 and 38 of the novel coupling 30 is illustrated. In this embodiment a series of cone shaped projections 118 are provided on a cylindrical rod 120 attached to end 36 of sleeve 32. End 38 contains a corresponding cone shaped guide and locking mechanism 122 through which rod 120 and bifurcated cones 118 are threaded and adjustably secured against the smaller size cone shaped opening 124 of cone shaped guide and locking mechanism 122.

FIGS. 10 and 11, illustrate a further embodiment of a locking strap 100 provided on end 36 of sleeve 32. In FIG. 10, strap 100 passes through a loop 130 disposed on end 38 with a corresponding loop 132 provided in a line with loop 130 through which strap 100 is used to bias against loop 132 and close ends 38 and 36. Strap 100 contains one or more areas of notches 134 which when mated through loop 130 provide an adjustable locking mechanism for coupling 30. Similarly in FIG. 11, loop 130 includes notches 136 for mating with notches 134 provided on strap 100.

As will be recognized from FIGS. 4 through 11, and hereinafter in the description of the preferred embodiment of the invention, a wide variety of locking means for ends 36 and 38 are available and will be apparent to those skilled in the art. The invention contemplates such modifications and substitutions of various fastening mechanisms without departing from the spirit and scope of the invention. It is further contemplated that the advantages of the invention will be achieved by utilizing various fastening mechanisms that provide a one way adjustable fastening mechanism which automatically locks to provide a combination tensioning and fastening system to engage sleeve 32 in close proximity to the lips and grooves located in the corrugated drain pipe. Couplings for applications in trenchers ordinarily employed require that all couplings and projections thereon for a 6⅜ inch pipe be less than an 1 inch. Couplings in accordance with the present invention including fastening and securing means increase the pipe diameter by about 0.25 inches. It will be recognized that the adjustably securing and fastening system should accommodate separate adjustable securement and fastening of each of the rows of teeth 42 of the coupling to provide a strong and independent engagement and securement of both halves of the coupling around the respective pipe sections to best achieve the advantages of the invention in utilizing the present coupling for a variety of pipe sizes and configurations.

Referring now to FIG. 12, 13 and 14, there is illustrated the preferred embodiment of the coupling 150 of the present invention. Coupling 150 includes elements such as the substantially flat portions 34, the holes 44, sleeve 32 and teeth 42, generally which correspond to the coupling in FIGS. 4 and 5 and which have been similarly numbered. In coupling 150, teeth 42 are rectangularly shaped and have been reduced in size resulting in an increase of the width of the substantially flat flexible portions 34 running the width of the sleeve 32. Coupling 150 further includes modifications at end 36 to include two flat strap projections 152 and 154, including a plurality of laterally disposed notches 156 thereon.

Disposed at end 38 for receiving strap 152 are openings 158 and 160, each of which opening includes two laterally disposed pawls 162 for engaging notches 156. Similarly disposed at end 38 for receiving strap 154 are openings 164 and 166 having two laterally disposed pawls 168 for engaging notches 156 disposed on strap 154. Coupling 150 further includes a plurality of rectangular shaped openings 170 to impart greater resiliency to the adjustably securing and fastening means for joining ends 36 and 38 of the coupling. It will be recognized that the combination of openings 170, holes 44 and wider sections 34 increase the resiliency of the coupling to form a tighter fit around abutting sections of pipe and in combination with the teeth 42 provide a coupling suited for the torque, twisting, bending and tension encountered in drain pipe installation.

Referring now to FIG. 15, a further embodiment is depicted of a novel coupling constructed in accordance with the present invention.

In FIG. 15, coupling 180 is amenable to a substantially flat manufacture and shipping of the coupling. Coupling 180 includes a substantially rectangular shaped sleeve 182 having ends 184 and 186. End 184 terminates in a means for adjustably securing and fastening ends 184 and 186 in a manner similar to the one depicted in FIG. 9, in which similar parts of the adjustably securing and fastening means have been numbered the same. The operation of this form of adjustably securing and fastening means for coupling 180 similarly functions and operates similar to the description of the means for adjustably securing and fastening means described with respect to FIG. 9.

Coupling 180 includes four flat flexible portions 188 disposed along the width of sleeve 182 to provide a resilient encircling sleeve 182 for coupling corrugated drain pipe. Ends 184 and 186 of sleeve 182 may be joined as depicted in FIG. 15 to form a plurality of arcuate shaped ribs 190 for engaging the lips and grooves of one section of corrugated drain pipe. A second series of parallel ribs 192 are provided adjacent to the first series of ribs 190 for engaging a corresponding series of lips and grooves in a second section of a drainpipe to provide a joint at or near the center of coupling 180. Coupling 180 similarly provides a resilient sleeve 182 in combination with a series of resilient ribs 190 and 192 to provide the advantages of the invention in connecting and installing plastic corrugated drainpipe through guide 16 and shoe 18 of the trencher 10 (FIG. 1) in trenching operations.

It will be recognized that the present invention has a wide range of applicability and is susceptible to modification by those skilled in the art to include a greater or lesser number of ribs or teeth to engage corrugated drainpipe while providing the advantages of the invention. More particularly, the ribs may be subdivided to form smaller wedge shaped teeth as heretofore discussed and may be molded in a number of rows to engage one or more of the lips and grooves of each section of pipe. The preferred embodiment of the invention however contemplates a single row of teeth or ribs disposed on each side of the sleeve in order to provide a coupling having a wide range of applicability to varying sizes and depths of lips and grooves in corrugations encountered in drainpipes in general use.

It is also contemplated that the novel coupling of the invention may be modified to include helically corrugated drainpipes by disposing the teeth at an angle to the sleeve to accommodate the pitch or angle encountered in the helically corrugated drainpipe which disposition of the teeth is deemed substantially parallel for the purposes of the invention. In addition, the necessary combination of flexibility and strength of the coupling may be achieved by providing a resilient bellows type sleeve portion. The invention may further be adapted for use with ordinary plastic pipes. For example the coupling may be utilized to connect plastic pipe having a lip or flange disposed at or near the end of a section of pipe to allow the teeth of the coupling to engage the lip or flange provided on the pipe to join the abutting pipes in the coupling.

The advantages of the invention are further enhanced by applying the novel coupling to connect sections of pipe wherein one or more couplings are joined in tandem and thereafter employed to connect sections of pipe having a circumference greater than the length of the sleeve member. More particularly the advantages of the invention in this embodiment allows the notches on end of the first sleeve member to engage the fastening means provided in a second coupling before applying the combined couplings to abutting sections of pipe and thereafter joining the notches on the second coupling with the means provided on the first coupling. In this manner the coupling of the invention may be joined with one another to accommodate a wide variety of pipe circumferences in addition to accommodating a wide variety of corrugation configurations.

It will be recognized the invention may be further modified to include the application of adhesives or sealants to the coupling to provide a fluid tight seal in application where such seals are required. These and other modifications and other applications of the present invention may be made within the spirit and scope of the invention as defined in the appended claims.

What is claimed is:

1. A one-piece pipe coupling for joining abutting sections of annularly corrugated non-metallic pipe having annular grooves and lips comprising:
   (a) a substantially rectangular non-metallic pipe coupling body having two ends and a resilient center portion radially deformable to form a sleeve member;
   (b) a first single row of ribs disposed along the length of said coupling body and adjacent to a first side of said coupling body;
   (c) a second single row of ribs disposed along the length of said coupling body and adjacent to a second side of said coupling body and substantially parallel to said first single row of ribs;
   (d) at least two strap projections integral with one end of said coupling body;
   (e) at least two strap engaging openings integral with the other end of said coupling body; and
   (f) independent tensioning and securing means provided in said strap projections and strap engaging openings cooperating with said first single row of ribs and said second single row of ribs and said resilient center portion to tension and secure said sleeve member around each abutting section of annularly corrugated pipe to the maximum extent permitted by the outside diameter and groove configuration of said pipe by forcing said first single row and second single row of ribs in securement with one corrugation of each abutting section of said pipe while providing a flexible joint by allowing cooperation between said first single row and second single row of ribs and said resilient center portion.

2. The one-piece pipe coupling of claim 1 wherein said first single row and said second single row of ribs disposed along the length of said coupling body are resilient.

3. The pipe coupling of claim 2 wherein said ribs are of an arcuate bifurcated pyramoidal configuration.

4. The one-piece pipe coupling of claim 1 wherein said independent tensioning and securing means includes rachet means disposed on said strap projections and pawl means disposed in said strap engaging openings.

5. The one-piece pipe coupling of claim 4 wherein said substantially rectangular non-metallic pipe coupling body includes a plurality of pawl means disposed in line with one another in said strap engaging openings.

6. The one-piece pipe coupling of claim 1 wherein said independent tensioning and securing means protrudes less than 0.25 inches from the outside diameter of said sleeve member.

7. The one-piece pipe coupling of claim 1 wherein said first single and said second single row of ribs are divided to form a plurality of teeth.

8. A universal one-piece pipe coupling for joining abutting sections of annularly corrugated non-metallic pipe comprising:
   (a) a flexible non-metallic member having two ends and a center portion radially resilient to form a sleeve member;
   (b) a first row of teeth disposed along the length of said member and adjacent to a first side of said member;
   (c) a second row of teeth disposed along the length of said member adjacent to a second side of said member and substantially parallel to said first row of resilient teeth;
   (d) at least two strap projections integral with one end of said member and substantially planar to the center portion of said member;
   (e) at least two strap engaging slots integral with the other end of said member and substantially planar to the center portion of said member;
   (f) means for independently tensioning and securing each of said strap projections in said strap engaging slots said means integral with said member and cooperating with said first row and said second row of teeth and said radially resilient center portion by allowing said first row and said second row of teeth to engage at least one corrugation of each abutting section of said pipe to tighten said member around each section of abutting annularly corrugated non-metallic pipe to the maximum extent permitted by the outside diameter and groove configuration of said pipe to provide an axially resilient sleeve member for joining abutting sections of annularly corrugated non-metallic pipe and thereby accomodate a variety of annularly corrugated pipe configurations and outside diameters.

9. The universal one-piece pipe coupling of claim 8 wherein said teeth of said first and second row of teeth are of a bifurcated wedge-shaped configuration.

10. The universal one-piece pipe coupling of claim 8 wherein said means for independently tensioning and securing said member around each section of abutting annularly corrugated non-metallic pipe includes a rachet means disposed on said strap projections and pawl means disposed in said strap engaging slots.

11. The universal one-piece pipe coupling of claim 10 wherein said flexible non-metallic member includes a plurality of pawl means in line with one another in said strap engaging slots.

12. The universal one-piece pipe coupling of claim 10 wherein one of said strap projections is longer than the other straps.

13. The universal one-piece pipe coupling of claim 10 wherein said strap projections are of a V-shaped cross section wherein said V-shaped cross section strap is adapted for engaging at least one corrugation of said annularly corrugated non-metallic pipe.

14. The universal one-piece pipe coupling of claim 8 wherein said coupling is molded in the form of a single sheet of non-metallic material wherein said sleeve and said teeth have a wall thickness of about 0.10 to about 0.25 inches.

15. The universal one-piece pipe coupling of claim 8 wherein teeth in each of said rows are joined to form a series or ribs.

16. A universal one-piece pipe coupling for joining abutting sections of annularly corrugated non-metallic drain pipe comprising:
  (a) a flexible non-metallic member of a generally flat rectangular configuration having a first and a second end and a resilient center portion radially deformable to form a sleeve member;
  (b) a first row of resilient non-metallic teeth disposed on said member and adjacent to a first side of said member;
  (c) a second row of resilient non-metallic teeth disposed on said member adjacent to a second side of said member and substantially parallel to said first row of resilient non-metallic teeth;
  (d) a first strap projection integral with said first end of said member and substantially planar with said member disposed substantially in line with said first row of resilient non-metallic teeth;
  (e) a second strap projection integral with said first end of said member and substantially planar with said member disposed substantially in line with said second row of resilient non-metallic teeth;
  (f) a first strap engaging slot integral with said second end of said member and substantially planar with said member and disposed substantially in line with said first row of resilient non-metallic teeth;
  (g) a second strap engaging slot integral with said second end of said member and substantially planar with said member and disposed substantially in line with said second row of resilient non-metallic teeth;
  (h) a first means for independently tensioning and securing said first strap projection in said first strap engaging slot said means integral with said member and cooperating with said first row of teeth and resilient center portion to tighten said member around a first section of annularly corrugated non-metallic pipe to the maximum extent permitted by the outside diameter and groove configuration of said first section of pipe;
  (i) a second means for independently tensioning and securing said second strap projection in said second strap engaging slot said second means integral with said member and cooperating with said second row of teeth and resilient center portion to tighten said member around a second section of annularly corrugated non-metallic pipe to the maximum extent permitted by the outside diameter and groove configuration of said second section of pipe wherein said first and second means when fully tensioned and secured around abutting sections of said pipe further cooperate with said first and second rows of resilient non-metallic teeth and said resilient center portion to provide an axially resilient sleeve member for joining abutting sections of annularly corrugated non-metallic pipe.

17. The universal one-piece pipe coupling of claim 16 wherein said coupling is formed of a resilient non-metallic material in a single molding operation.

18. The universal one-piece pipe coupling of claim 16 wherein said coupling sleeve member is formed of a resilient non-metallic material having a thickness of about 0.02 inch to about 0.5 inches.

19. The universal one-piece pipe coupling of claim 16 wherein said teeth are of a bifurcated wedge-shaped configuration.

20. The universal one-piece pipe coupling of claim 19 wherein said teeth are about 0.21 to 0.36 inches wide at the base and about 0.21 to 1 inch long at the base and about 0.015 to about 0.20 wide at the bifurcated wedge shaped tip and about 0.20 to about 0.99 inches long at the bifurcated wedge shaped tip.

21. The universal one-piece pipe coupling of claim 20 wherein said teeth in each row are disposed about 0.50 inches from one another along the length of said sleeve member.

22. The universal one-piece pipe coupling of claim 20 wherein said teeth are about 0.30 inches wide at the base and about 0.5 inches long at the base and about 0.15 inches wide at the bifurcated wedge shaped tip and about 0.5 inches long at the bifurcated wedge shaped tip.

* * * * *